Patented Apr. 1, 1924.

1,488,993

UNITED STATES PATENT OFFICE.

CHARLES J. LINDSTROM, OF CHICAGO HEIGHTS, ILLINOIS.

PASTE COMPOSITION.

No Drawing.   Application filed March 27, 1922. Serial No. 547,216.

*To all whom it may concern:*

Be it known that I, CHARLES J. LINDSTROM, a citizen of the United States, residing at Chicago Heights, in the county of Cook and State of Illinois, have invented certain new and useful Improvements in Paste Compositions, of which the following is a specification.

This invention has as its object a novel paste composition designed primarily for use in attaching labels to cans and other metallic containers, glass containers, and the like.

In preparing the paste I first make a solution by adding to one and one-half gallons of boiling water, two pounds of caustic soda and two ounces of caustic potash, dissolving the alkalies in the water and then permitting the solution to cool.

I next prepare a paste solution by adding six ounces of wheat, rye, or potato flour, or corn starch, to one gallon of cold water, stirring thoroughly so as to avoid the formation of lumps. To this gallon of paste solution I then add eight ounces of the alkali solution first prepared and fifteen drops of carbolic acid and thirty drops of sulphuric acid, thoroughly stirring and mixing the whole.

In accordance with the foregoing, the finished product will have approximately the following composition:

| | |
|---|---|
| Water | 136 oz. |
| Caustic soda | 1⅓ oz. |
| Caustic potash | 1 dram. |
| Wheat or other flour | 6 oz. |
| Carbolic acid | 15 drops. |
| Sulphuric acid | 30 drops. |

The paste prepared as above will constitute an effective adhesive for uniting paper, cloth, or similar material, to metallic or glass surfaces, and it will not noticeably deteriorate with age. Furthermore the paste is colorless and, should it thicken, may be thinned to the proper consistency by the mere addition of a suitable volume of water.

Having thus described the invention, what is claimed as new is:

A paste composition consisting of a mixture of the following ingredients in approximately the proportions stated: water 136 ounces, caustic soda 1⅓ ounces, caustic potash 1 dram, cereal flour 6 ounces, carbolic acid 15 drops, and sulphuric acid 30 drops.

In testimony whereof I affix my signature.

CHARLES J. LINDSTROM. [L. S.]